May 14, 1940. H. ERDMANN 2,200,472
GRANULAR MATERIAL SEPARATING MACHINE
Filed June 29, 1938

INVENTOR.
HANS ERDMANN

Patented May 14, 1940

2,200,472

UNITED STATES PATENT OFFICE 2,200,472

GRANULAR MATERIAL SEPARATING MACHINE

Hans Erdmann, Montclair, N. J., assignor to Schering Corporation, Bloomfield, N. J., a corporation of New Jersey Application June 29, 1938, Serial No. 216,429

3 Claims. (Cl. 209—27)

This invention relates to a machine for assorting and selecting granules of material, of a generally uniform size, from the smaller and larger particles of such materials and other usually associated materials.

The machine of this invention was particularly designed to select, from the larger mass, such granules of bassorin as are found to be of suitable size for further treatment and ultimately used as a laxative. This invention is adaptable for other uses in connection with the assortment of granular and like materials, the removal of the undesirable smaller particles and other usually accompanying materials.

Bassorin, a natural gum, is used in considerable quantities as a laxative. In this connection it is desirable to use only small granules (approximately one-eighth of an inch in diameter) in order that the finished, packaged product shall consist of a mass of granules of the same general size. Bassorin in its usual raw state is associated with some exceedingly fine bassorin material which may be generally described as bassorin "dust" and also with slivers or particles of bark and fibrous material from the plants from which bassorin is obtained. Such "dust" and bark particles are removed by the use of this invention and the larger bassorin granules are separated from the desired, generally uniform, granules.

Figure 1:
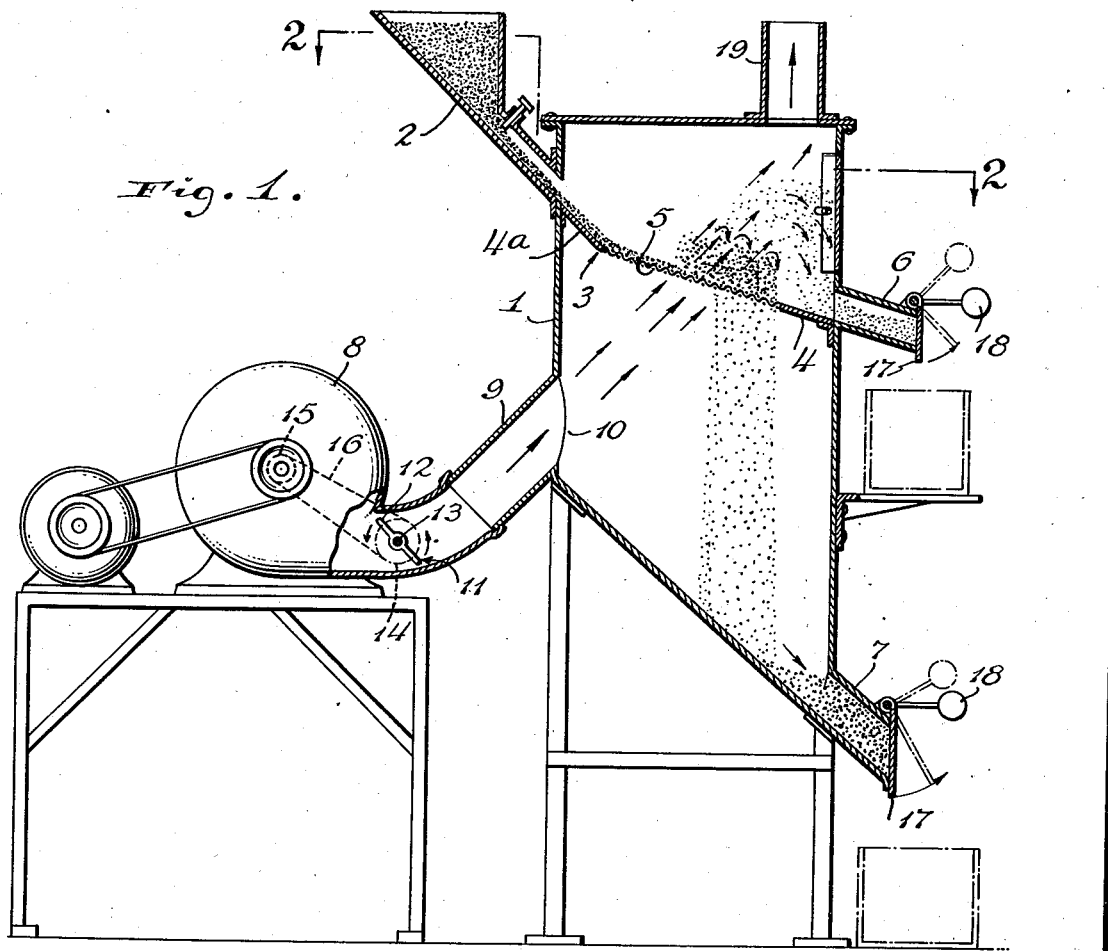
Figure 2:
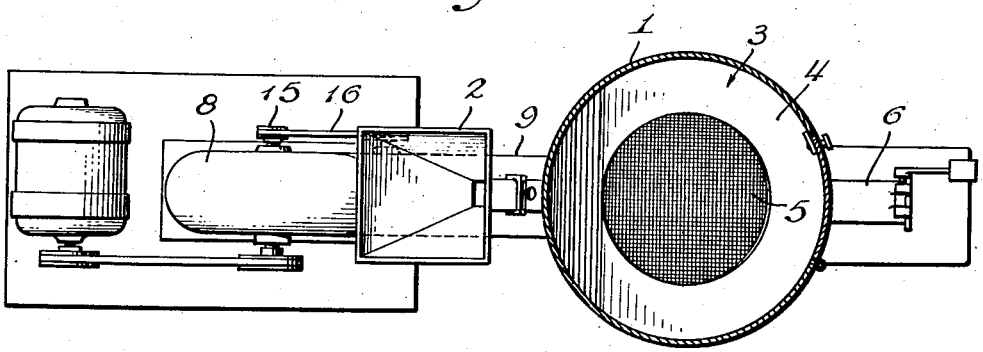

In the drawing, Fig. 1 is a section of the entire machine, and Fig. 2 is a section on the line 2—2 of Fig. 1.

The casing 1 may be made of sheet iron and is generally circular in cross section. At the left upper side the casing is provided with a hopper 2 into which the raw, commercial bassorin is placed. The hopper 2 directs the raw material within the casing 1 to the partition 3 which extends diagonally across the casing. The partition 3 comprises an outer ring portion 4 secured circumferentially to the inner wall of the casing and is apertured centrally, over which aperture a screen 5 is secured having a mesh size (No. 8 mesh to pass granules about one-eighth of an inch in diameter) to pass the granules to be selected. The screen 5 is preferably inclined at an angle approximating between 10°-20°, whereas the portion 4a of the ring portion 4, which lies in line with the mouth of the hopper 2, is set at an angle of approximately 45°. The side of the casing opposite the hopper 2 is provided with two outlets 6 and 7. The outlet 6 provides an exit for the rejected components of the bassorin mass and the outlet 7 provides an exit for the selected granules. A motor-driven blower 8 of any conventional type, capable of delivering a mild current of air into the casing 1 is located preferably beneath the hopper 2. The blower 8 is provided with an air duct 9, passing through the casing 1 and having its outlet 10 directed toward the screen 5 in order to direct the air current beneath the screen and beneath the bassorin mass lying thereon. An air current interrupter 11 is positioned in the duct 9 and comprises a blade or damper 12 mounted on the shaft 13, carrying pulley 14, driven from the rotating pulley 15 by the belt 16. The blade 12 is rotated at a speed approximately from 800 to 1000 revolutions per minute. The damper 12 is of such diameter as to substantially close (except for leakage) the duct 9 when, in its rotation, it is crosswise of the duct and permits flow of air when in all other positions.

Each of the outlets 6 and 7 is provided, at its open end, with pivoted covers 17, normally closed by the counterweights 18, and suitable receptacles are placed beneath the outlets 6 and 7 into which the materials issuing from the respective outlets are periodically dumped, by manual opening of the covers 17. An outlet 19 is provided in the upper portion of the casing for the escape of air originating at the blower and possibly the finer particles of bassorin referred to as "dust". A door may be provided immediately above the outlet 6 to permit access to the screen 5 and the material lying thereon.

The operation of the device is as follows:

A quantity of commercial, raw bassorin is placed in the hopper 2 and this, by gravity, spreads over the screen 5, gradually thinning out in the direction of the outlet 6. The air current originating with the blower 8 and directed toward the bassorin mass lying on the screen 5 is periodically interrupted by the damper 12; consequently air in pulsations, fluctuations, or waves, is directed against the underside of the screen 5 and the bassorin mass. The pulsations, fluctuations, or waves of air, impinge against the underside of the bassorin mass and tend to pass therethrough. At the right side of the bassorin mass, where it lies in a thin layer, the intermittent air waves, being of sufficient velocity for this purpose, not only raise the "dust" and fibrous and bark particles from the mass but also cause the individual bassorin granules to rise, with a boiling-like effect and to immediately fall back upon the screen when the air current is diminished, the rise and fall of the granules of the bassorin being in step with the intermittent air waves. Inasmuch as the air waves follow each other with great rapidity (substantially 800 per minute), bassorin granules are constantly rising from and falling upon the screen. The current of air tends to pick the lighter particles, such as bassorin "dust", fibrous matter and bark, and raise them substantially higher than the heavier granules of bassorin. When the materials to be discarded fall, they tend to fall upon the solid ring section 4 at the right side and accumulate near the outlet 6. Some of the particles, particularly the larger fibrous or bark particles, may fall or remain upon the screen 5 but they will accumulate at the top of the layer and can readily be removed. The bassorin granules to be selected ultimately fall through the mesh of the screen 5 as they descend from the elevation to which they are blown by the air waves. The selected granules ultimately fall upon the inclined base of the hopper and accumulate at the outlet 7.

In Fig. 1, the mass of granules is shown in the hopper 2; the arrows beneath the screen 5 indicate the course of the air waves; the curved arrows indicate the height to which the granules are elevated or lifted by the air waves and the dotted area above the curved arrows indicates the materials which are blown to a greater elevation than the granules and finally fall upon the solid portion of the ring 4 and pass toward the outlet 6.

It is to be noted that the current of air is directed diagonally with respect to the vertical axis of the container 1 and consequently tends to blow the materials to be removed toward the casing 1 and above the solid portion of the ring 4 upon which much of it will descend.

The force of the air current and the rapidity of the interruptions thereof will vary with the type of material being treated and it therefore may be necessary, with each type of material, that adjustments be made to compensate for the type of material being treated and the size of the granules.

The particular type of interrupter illustrated in connection with the invention may be replaced by other forms of devices which have the capacity of periodically causing a blast, puff, or waves of air to be created within the casing 1, but for practical purposes the type of rotating blade interrupter of this invention has been found to be satisfactory.

In the drawing, the casing is shown circular in cross section, but the device will operate satisfactorily should the casing be made square or of other configuration in cross section.

I claim:

1. In a device for separating granules from fibrous and other foreign material normally found therein, in combination a casing, a screen in the casing, the openings in the screen being of a size to permit passage of substantial amounts of said granules, a supply opening having communication with the screen, means to deliver in quick succession currents of air in waves to the screen, said currents of air passing through the screen and contacting the granules upon the screen at the under side of said granules, said successive wave currents being of such velocity as to physically raise granules and foreign matter from the surface of the screen to blow the foreign matter away from the screen, raised granules being adapted to fall upon the screen during the low cycle of the waves and pass through said screen, said air currents being the sole means of raising granules and foreign matter from said screen and to separate and carry away foreign matter.

2. A device of the character described in claim 1 in which the screen is bordered by a shelf, which shelf lies within the path of descending foreign matter and upon which the descending foreign matter falls.

3. In a device of the character described in claim 1 in which the casing is provided with two outlets and an inlet, one outlet being located below the screen for the withdrawal of granules and the other outlet being located above the screen and below the greatest heighth to which foreign matter is raised, and the inlet being located below the screen and directed toward the screen, a rotary blower having communciation with said inlet, said blower being adapted to continuously create air currents and a rotary interrupter adapted to periodically cut off the flow of air from said inlet towards said screen.

HANS ERDMANN.